UNITED STATES PATENT OFFICE.

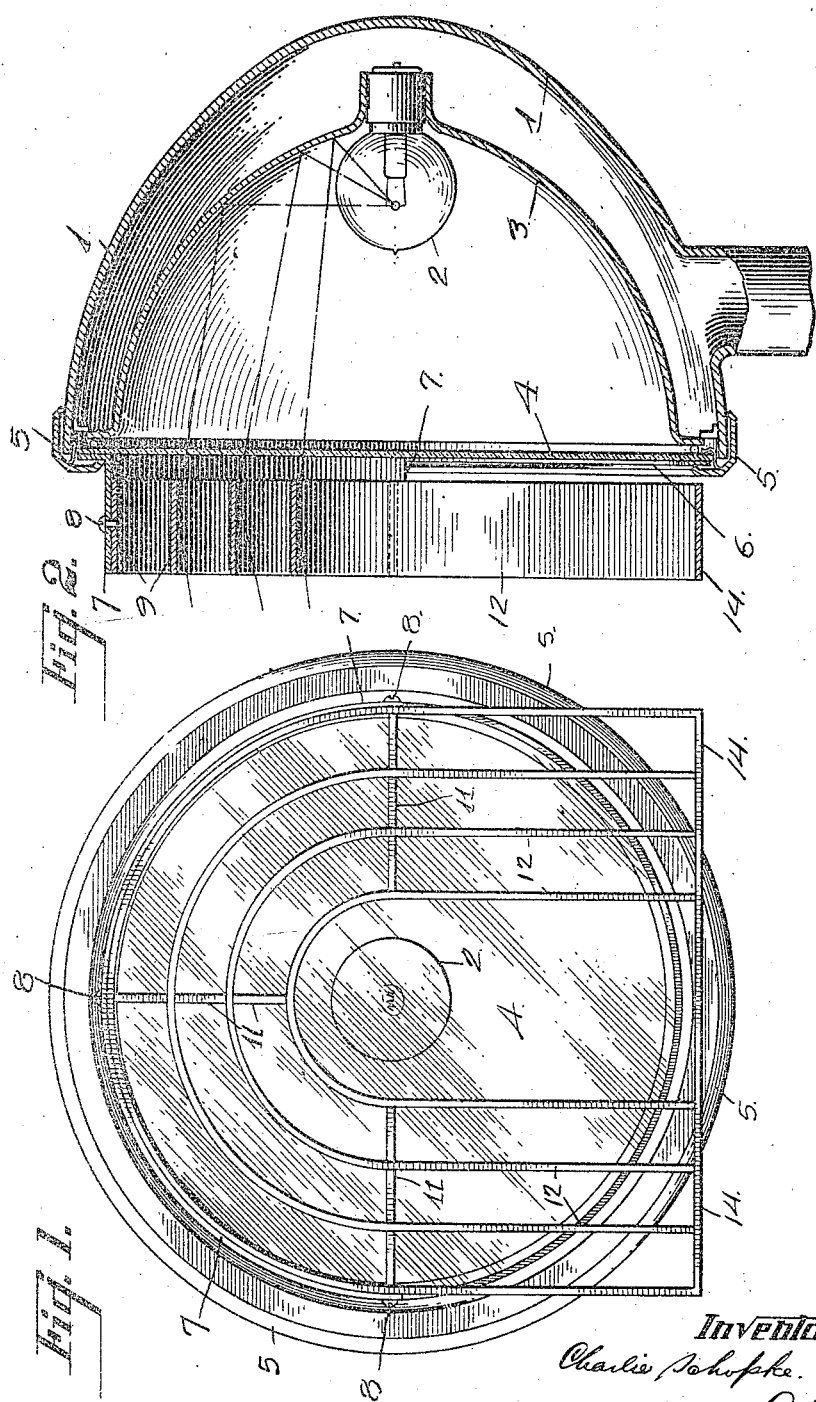

CHARLIE SCHOPKE, OF SAN FRANCISCO, CALIFORNIA.

NONGLARING ATTACHMENT FOR HEADLIGHTS.

1,421,847.  Specification of Letters Patent.  Patented July 4, 1922.

Application filed June 2, 1921. Serial No. 474,518.

*To all whom it may concern:*

Be it known that I, CHARLIE SCHOPKE, a citizen of the United States, residing in the city and county of San Francisco and State of California, have invented a new and useful Improvement in a Nonglaring Attachment for Headlights, of which the following is a specification.

My invention relates to improvements in non-glaring attachments for motor vehicle headlights wherein a plurality of reflecting members operate to reflect the light rays from the headlight onto the ground in advance thereof.

The primary object of the present invention is to provide a new and improved nonglaring device for motor vehicle headlights.

Another object of the invention is to provide a new and improved device of the character described which is simple in construction and may be easily and cheaply produced.

A further object of the invention is to provide improved means for reflecting certain diverging light rays from the headlight onto the ground in advance thereof thereby illuminating said ground in advance of the vehicle and eliminating the glare which might otherwise confuse and inconvenience operators of vehicles approaching from the opposite direction.

I accomplish these and other objects by means of the improved device disclosed in the drawings forming a part of the present specification wherein like characters of reference are used to designate similar parts throughout the said specification and drawings, and in which:

Fig. 1 is a front elevation of a motor vehicle headlight disclosing my device applied thereto; and Fig. 2 is a vertical sectional view of Fig. 1.

Referring to the drawing the numeral 1 is used to designate a motor vehicle headlight having the usual lamp 2 therein mounted within a suitable reflector 3, and also provided with a suitable glass lens 4 held in position at the front of the headlight 1 by means of any suitable rim 5.

Detachably mounted between the front of the headlight 1 and the rim 5 is a ring 6 having a semi-circular flange 7 on the upper half thereof and projection through the rim 5.

Detachably connected to the flange 7 by means of suitable screws 8 or any other suitable securing device, are a plurality of arcuate or semi-circular members 9 arranged opposite or in front of the upper portion of the headlight 1 and in parallel relation to each other and concentric to the axis of the headlight 1 and arranged to reflect diverging light rays from the headlight 1 onto the ground in advance of said headlight 1, thereby illuminating the ground in front of a vehicle upon which the device is mounted, as disclosed in Fig. 2 of the drawings.

The reflecting members 9 are provided with vertically disposed depending extensions or portions 12 which extend to the lower portion of the headlight 1 and are also arranged to reflect diverging light rays from the headlight 1 back toward the axis of said headlight and thereby eliminate the glare which is so annoying and dangerous to the operators of approaching vehicles.

The extensions 12 and the semi-circular reflecting members 9 being arranged parallel to the axis of the headlight 1 all tend to direct the light rays parallel to the axis of the headlight 1 and to tend to prevent any great divergence of said light rays, thereby concentrating the light rays onto the roadway or ground in front of the vehicle.

The lower ends of the vertical extensions 12 are connected by a lateral member 14.

Having thus described my invention what I claim as new and desire to secure by Letters Patent is:

A non-glaring attachment for motor vehicle headlights comprising a plurality of semi-circular reflecting members arranged on the upper portion of said headlight and parallel to the axis thereof to reflect upper diverging rays from said headlight onto the ground in advance thereof, said members having vertically disposed depending portions arranged to reflect lower diverging rays back towards the plane of the axis of said headlight; a ring detachably mounted between the front of the headlight and the lens rim thereof and having a semi-circular flange projecting through said rim; and means for detachably connecting said members to said flange.

In witness whereof I hereunto set my signature.

CHARLIE SCHOPKE.